(12) United States Patent
Bitter et al.

(10) Patent No.: US 12,190,187 B1
(45) Date of Patent: Jan. 7, 2025

(54) MAGNETIC STRIPE CARD WITH SKIMMER DETECTION MECHANISM

(71) Applicant: UIPCO, LLC, San Antonio, TX (US)

(72) Inventors: Dustin Bowen Bitter, Lehi, UT (US); Nina Cooper, San Antonio, TX (US); Andre Rene Buentello, San Antonio, TX (US); Jose L. Romero, Jr., San Antonio, TX (US); Gregory David Hansen, Fuquay Varina, NC (US)

(73) Assignee: United Services Automobile Association (USAA), San Antonio, TX (US)

( * ) Notice: Subject to any disclaimer, the term of this patent is extended or adjusted under 35 U.S.C. 154(b) by 316 days.

(21) Appl. No.: 17/731,771

(22) Filed: Apr. 28, 2022

(51) Int. Cl.
  *G06F 21/00* (2013.01)
  *G06K 19/06* (2006.01)
  *G06K 19/07* (2006.01)
  *G06K 19/073* (2006.01)

(52) U.S. Cl.
  CPC . G06K 19/07372 (2013.01); G06K 19/06196 (2013.01); G06K 19/0708 (2013.01)

(58) Field of Classification Search
  CPC ....... G06K 19/07372; G06K 19/06196; G06K 19/0708
  See application file for complete search history.

(56) References Cited

U.S. PATENT DOCUMENTS

| | | | |
|---|---|---|---|
| 10,095,970 B1* | 10/2018 | Mullen | G06K 19/0702 |
| 2016/0171361 A1* | 6/2016 | Chatterton | G06F 21/77 705/41 |
| 2017/0365134 A1* | 12/2017 | Kurian | G06K 19/06187 |
| 2019/0130240 A1* | 5/2019 | Scaife | G06K 19/07309 |
| 2019/0340892 A1* | 11/2019 | Rodriguez Bravo | G06K 19/07769 |
| 2023/0410114 A1* | 12/2023 | Yin | G06Q 20/341 |

OTHER PUBLICATIONS

Salvador Mendoza, Hunter Cat: Aspects and Characteristics, Aug. 1, 2019, pp. 1-8 (Year: 2019).*

* cited by examiner

*Primary Examiner* — William A Corum, Jr.
(74) *Attorney, Agent, or Firm* — Plumsea Law Group, LLC (57) ABSTRACT

Magnetic stripe cards including a skimmer detection mechanism detect unauthorized access to data and information stored on a magnetic strip of a magnetic stripe card by illicit card skimming devices. In one embodiment, a method of detecting an unauthorized scan of confidential data encoded on a magnetic strip portion of a magnetic stripe card having a skimmer detection mechanism includes detecting a scan of the magnetic strip portion, measuring a parameter associated with the scan of the magnetic strip portion by the skimmer detection mechanism, and comparing the measured parameter to a baseline value associated with the parameter. Upon determining that the parameter exceeds the baseline value, an unauthorized scan of confidential data encoded on the magnetic strip portion of the magnetic stripe card is detected.

20 Claims, 9 Drawing Sheets

MAGNETIC STRIPE CARD WITH SKIMMER DETECTION MECHANISM

TECHNICAL FIELD

This disclosure relates to magnetic stripe cards, such as credit cards, debit cards, and identity or access cards, that have a security mechanism that could be used to detect card skimming by illicit devices.

BACKGROUND

Magnetic stripe cards such as credit cards and debit cards are designed to be read using, for example, magnetic stripe card readers at terminals of retailers, banks and other institutions. When these magnetic stripe cards are used at a retailer or a bank, for example, the system uses data stored in their magnetic strip to authorize the transaction. The card data stored in the magnetic strip might be stolen by unauthorized persons using illicit skimming devices (e.g., card skimmers) that, for example, could copy and store and the data from the magnetic strip. This stolen card data could then be used to clone fraudulent cards and/or consummate fraudulent transactions such as the purchase of expensive consumer products, or to withdraw funds from bank accounts, for example. Identity and/or access cards that are used to gain entry into hotel rooms or restricted-entry facilities often also contain magnetic strips that might also be vulnerable to data theft that would allow duplicate identity cards to be fabricated.

Card skimming devices are often attached to existing magnetic stripe card readers at retail locations, such as ATMs and gas stations. These card skimming devices can be hard to identify upon casual inspection. For these reasons, there is a need to detect skimming of card data from magnetic stripe cards and to notify the user that the card was skimmed. The illicit skimming device can be reported or removed so that it does not continue to obtain sensitive information stored on other magnetic stripe cards.

SUMMARY

In one aspect, a magnetic stripe card is provided. The magnetic stripe card includes a body, a magnetic strip portion disposed on the body, and a skimmer detection mechanism configured to detect when the magnetic strip portion of the magnetic stripe card has been read by an illicit card skimming device.

In another aspect, a magnetic stripe card is provided. The magnetic stripe card includes a magnetic strip portion, a skimmer detection mechanism comprising at least one sensor, and an indicator. The indicator is configured to notify a user of the magnetic stripe card when the skimmer detection mechanism detects that the magnetic strip portion has been read by an illicit card skimming device.

In yet another aspect, a method of detecting an unauthorized scan of confidential data encoded on a magnetic strip portion of a magnetic stripe card having a skimmer detection mechanism is provided. The method includes detecting a scan of the magnetic strip portion of the magnetic stripe card. The method also includes measuring at least one parameter associated with the scan of the magnetic strip portion of the magnetic stripe card by the skimmer detection mechanism. The method further includes comparing the measured at least one parameter to a baseline value associated with the parameter. Upon determining that the at least one parameter exceeds the baseline value, the method includes detecting an unauthorized scan of confidential data encoded on the magnetic strip portion of the magnetic stripe card.

BRIEF DESCRIPTION OF THE DRAWINGS

The embodiments disclosed herein may be better understood with reference to the following listed drawings and their descriptions. The components in the drawings are schematic rather than representational, and are not necessarily to scale, the emphasis of the disclosure being placed upon illustrating the purpose of implementing the systems and methods disclosed herein. Moreover, in the drawings, like reference numerals designate corresponding parts throughout the drawings.

DESCRIPTION OF EMBODIMENTS

The embodiments disclosed herein provide systems and methods for detecting unauthorized access to data and information stored on a magnetic strip of a magnetic stripe card. A magnetic stripe card, also referred to as a swipe card, is a card with a magnetic strip or magstripe attached on its surface. This magnetic strip is made of tiny iron-based particles or components in a plastic-like film whose magnetism is modified to store information. Each particle is essentially a tiny bar magnet about 20 millionths of an inch long. The magnetic strip on a magnetic stripe card can be "written" or encoded with information because the tiny iron-based particles that make up the magnetic strip are magnetized in different directions by a device that produces a strong magnetic field, such as a solenoid.

The information or data stored on the magnetic strip of a magnetic stripe card is read using a magnetic stripe card reader. A magnetic stripe card reader has a reader head that contains a coil wound into a tightly packed helix. The coil winds around a high-permeability, metallic core that produces a strong magnetic field when a current passes through it. When a card is moved over or through a magnetic stripe card reader, it induces a voltage in the coils of the magnetic stripe card reader. This voltage can be amplified and recorded electronically, which is finally read by a computer or a processor installed within the reader to authenticate a transaction (in the case of credit/debit cards) or a user (in the case of identity or access cards).

Unauthorized persons may use illicit card skimming devices that physically attach to existing magnetic stripe card readers (such as those used at payment terminals at retailers or banks, or at entry points, for example) to obtain or download confidential account data or information stored on the magnetic strip of cards swiped through the comprised magnetic stripe card reader. The unauthorized persons may then use this confidential account data to consummate fraudulent transactions or to clone or fabricate counterfeit cards having magnetic strips encoded with the account data that could then be used to successfully consummate fraudulent transactions or to gain entry to a restricted-entry facility.

As used herein, credit cards, debit cards, identity cards, access cards and other cards that use a magnetic strip to encode information shall be referred to herein as "magnetic stripe cards." For convenience, the information, instructions or other data stored in the magnetic strip will be referred to herein as "confidential data." Also, for convenience, persons attempting to skim magnetic stripe cards in order to obtain or download the confidential data shall be referred to herein as "unauthorized persons." For convenience, the illicit devices used by such unauthorized persons to obtain or download the confidential data shall be referred to herein as "card skimming devices" or "card skimmers".

Briefly, the embodiments described herein provide magnetic stripe cards with skimmer detection mechanisms that detect when the card has been read by an illicit card skimming device. When the owner of the magnetic stripe card removes the card from a magnetic stripe card reader, an indicator on the card may notify the user that an unauthorized scan or skim of the confidential data stored in the magnetic strip by an illicit card skimming device has been detected. The detected illicit card skimming device may then be reported or removed to prevent additional confidential data from other magnetic stripe cards from being skimmed by the illicit device.

Figure 1:
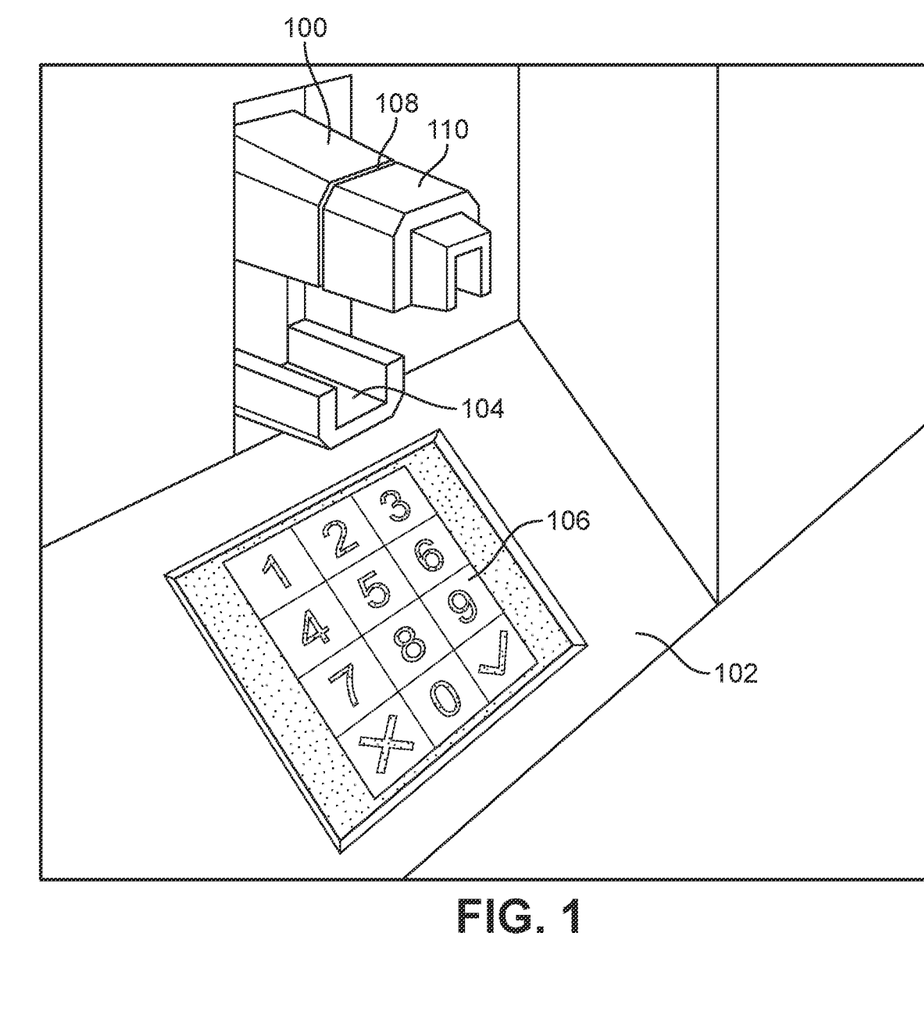
FIG. 1 is a schematic view of an example embodiment of an illicit card skimming device attached to a magnetic stripe card reader to obtain confidential data stored on a magnetic stripe card.

Referring now to FIG. 1, a schematic view of an example embodiment of an illicit card skimming device attached to a magnetic stripe card reader to obtain card data stored on a magnetic stripe card is shown. In this embodiment, a representative magnetic stripe card reader 100 associated with a transaction terminal 102, such as an ATM or gas station payment terminal, is shown. Magnetic stripe card reader 100 may have various forms, but generally includes at least a slot 104 for receiving a magnetic stripe card and a keypad 106 that allows a user of the magnetic stripe card to enter authentication information, such as a PIN or zip code.

It should also be understood that magnetic stripe card reader 100 includes other conventional components, such as magnetic coils, circuitry, and/or processors that allow magnetic stripe card reader 100 to read the magnetic stripe card, obtain the confidential information stored on the magnetic strip of the magnetic stripe card, and contact the card issuer or bank to obtain approval for the transaction.

In this embodiment, an illicit card skimming device 110 is attached to magnetic stripe card reader 100. For example, as shown in FIG. 1, card skimming device 110 may be attached to an end 108 of magnetic stripe card reader 100 so that it appears that card skimming device 110 is part of magnetic stripe card reader 100. With this arrangement, while card skimming device 110 may be detected by a detailed inspection, card skimming device 110 may blend in or be disguised upon only a causal or cursory inspection. It should be understood that the particular configuration of card skimming device 110 and magnetic stripe card reader 100 shown in FIG. 1 is exemplary and other configurations may be provided. In most cases, the card skimming device is designed to cover or attach to the existing magnetic stripe card reader so that it is not easily detected.

Figure 2:
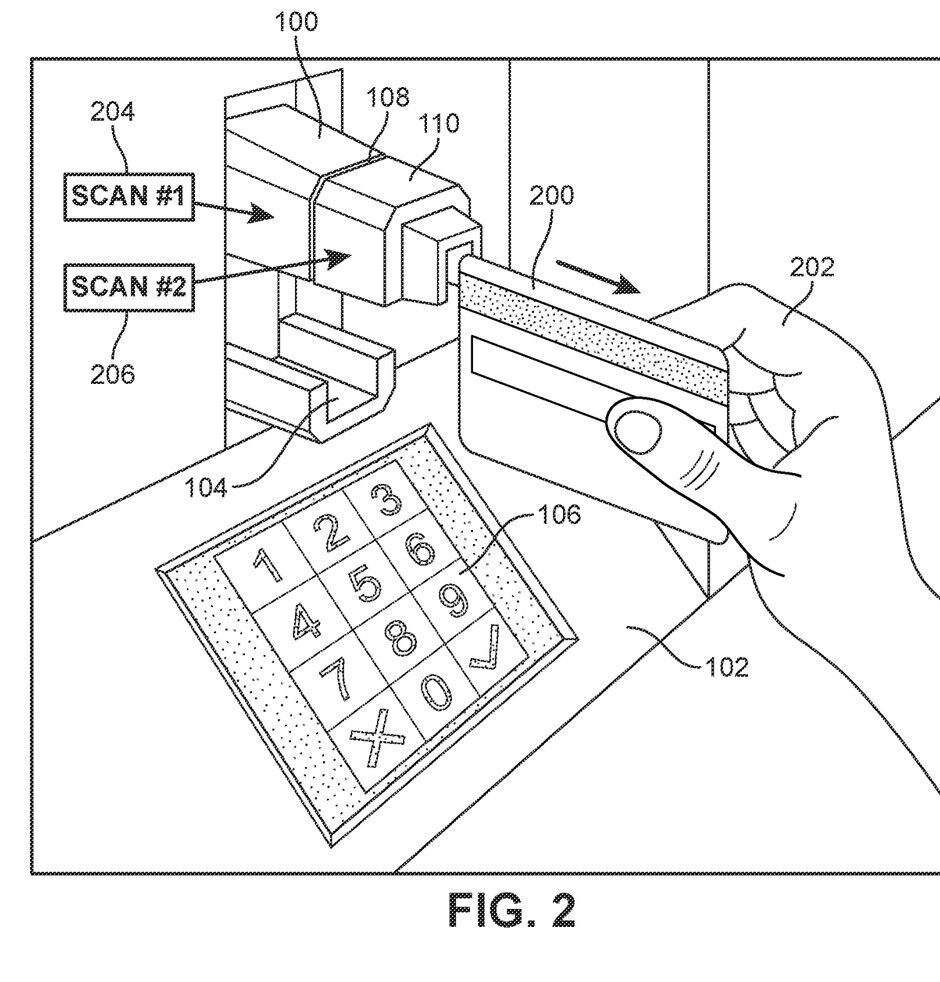
FIG. 2 is a schematic illustration of a typical scenario in which an illicit card skimming device attached to a magnetic stripe card reader may be used to obtain confidential data stored on a magnetic stripe card.

Referring now to FIG. 2, a schematic illustration of a typical scenario in which an illicit card skimming device attached to a magnetic stripe card reader may be used to obtain card data stored on a magnetic stripe card is shown. In the example scenario of FIG. 2, a user inserts and then removes a magnetic stripe card 200 from slot 104 of magnetic stripe card reader 100 associated with transaction terminal 102. The movement or motion of magnetic stripe card 200 through slot 104 as a hand 202 of the user pulls magnetic stripe card 200 from slot 104 induces a voltage in the coils of magnetic stripe card reader 100. This voltage can be amplified and recorded electronically as a first scan 204 of the confidential data stored on the magnetic strip of magnetic stripe card 200. The confidential data from first scan 204 is then read by a computer or processor installed within reader 100 to authenticate the transaction.

In this scenario, with illicit card skimming device 110 attached to magnetic stripe card reader 100, when hand 202 of the user pulls magnetic stripe card 200 from slot 104, the induced voltage is also detected by illicit card skimming device 110. Illicit card skimming device 110 can also amplify and electronically record this voltage as a second scan 206 of the confidential data stored on the magnetic strip of magnetic stripe card 200. The confidential data illicitly obtained by card skimming device 110 from second scan 206 is then stored or transmitted by components of card skimming device 110 to skim the confidential data from magnetic stripe card 200 for use in fraudulent transactions and/or to clone (i.e., make an unauthorized copy) of magnetic stripe card 200.

The techniques of the example embodiments described herein provide a security mechanism for magnetic stripe cards in the form of skimmer detection mechanisms that detect when the card has been read by an illicit card skimming device. These skimmer detection mechanisms may also notify the user of the magnetic stripe card that an unauthorized scan or skim of the confidential data stored in the magnetic strip by an illicit card skimming device has been detected to alert the user that the card has been skimmed. Upon seeing the notification, the user may take action, such as reporting or removing the illicit card skimming device and/or contacting the card issuer to report a potential security issue.

The skimmer detection mechanisms of the present embodiments use sensors embedded or included in the magnetic stripe card to detect one or more parameters that are compared with a baseline or predetermined threshold value. The baseline or predetermined threshold value is determined based on a typical scan of a magnetic stripe card through an uncompromised magnetic stripe card reader. The skimmer detection mechanism measures a value of the one or more parameters when the card is scanned or swiped through the card reader and compares the measured parameter values to the baseline or predetermined threshold value for that parameter. If the measured value of one or more parameters exceeds or deviates from the expected value (i.e. the baseline or predetermined threshold value), then the skimmer detection mechanism determines that an unauthorized scan or skim of the confidential data stored in the magnetic strip of the card by an illicit card skimming device has been detected.

In different embodiments, the parameters used by the skimmer detection mechanism to determine whether or not the card has been skimmed may vary. For example, parameters may include, but are not limited to: a number of times a card has been scanned or read, an amount of time a card spends within a card reader, an amount of force applied to the card, as well as other parameters that may be indicative of the presence of an illicit card skimming device that causes the parameter to deviate from an expected value (i.e. a baseline or predetermined threshold value for that parameter). Additionally, one or more of the different embodiments of skimmer detection mechanisms described herein may be used in combination together in a single card to provide robust detection of illicit card skimming devices.

Figure 3:
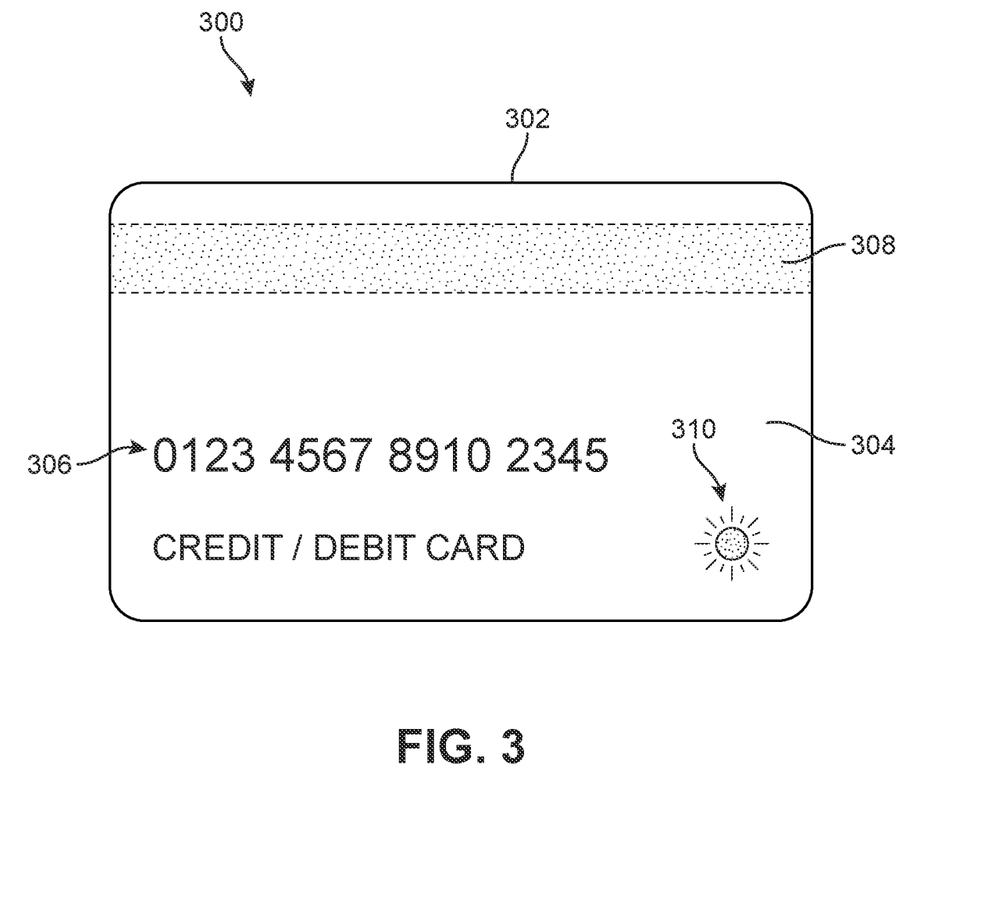
FIG. 3 is an example embodiment of a magnetic stripe card with a skimmer detection mechanism.

FIG. 3 is an example embodiment of a magnetic stripe card with a skimmer detection mechanism. In some embodiments, a magnetic stripe card 300 may be provided with a skimmer detection mechanism to detect when card 300 has been read by an illicit card skimming device and notify the user. In this embodiment, card 300 has a body 302 having a generally rectangular shape. The length and width of body 302 of card 300 generally matches the length and width of a conventional credit card. In some embodiments, card 300 may have a generally uniform thickness, while in other embodiments, card 300 may have different thicknesses. In an example embodiment, card 300 has a front side 304 on which card information 306 may be provided. Card information 306 may include, but is not limited to: a credit card number, expiration date, card holder name, issuing bank name, security codes, etc. In some cases, portions of card information 306 may be additionally or alternatively located on the back side of card 300 (e.g., opposite from front side 304).

In an example embodiment, card 300 includes a magnetic strip region 308. In this embodiment, magnetic strip region 308 is located on the back side of card 300 (e.g., opposite from front side 304). In other embodiments, magnetic strip region 308 may be located on front side 304 of card 300. Magnetic strip region 308 is encoded with confidential data. Magnetic strip region 308 may be any suitable type of magnetic strip, including a high-coercivity (HiCo) magnetic strip which is encoded with and can withstand the presence of a very strong magnetic field (on the order of ~4000 Oersted) or low-coercivity (LoCo) magnetic strip which is encoded with a low-intensity magnetic field (on the order of ~300 Oersted). For example, hotel room key cards and other types of identity or access cards are typically LoCo cards, whereas bank credit cards or debit cards, are typically HiCo cards.

In the example embodiments, the shape and thickness of body 302 of card 300 are sized and dimensioned so that card 300 is able to slide into a conventional magnetic stripe card reader, such as magnetic stripe card reader 100, described above. Likewise, magnetic strip region 308 has a thickness that is selected so that magnetic strip region 308 can slide into a conventional magnetic card stripe reader, such as magnetic stripe card reader 100, described above. In some embodiments, the thicknesses of magnetic strip region 308 of card 300 may match the thickness of a conventional credit card.

In an example embodiment, card 300 includes an indicator 310 associated with a skimmer detection mechanism. Indicator 310 is configured to notify a user of card 300 that card 300 has been read by an illicit card skimming device, as will be described in more detail below. In this embodiment, indicator 310 is located on front side 304 of card 300, for example, adjacent to or near card information 306, so that indicator 310 may be easily visible and/or noticeable by a user of card 300. In other embodiments, indicator 310 may be located on other portions of card 300, including, for example, on the back side.

Figure 4:
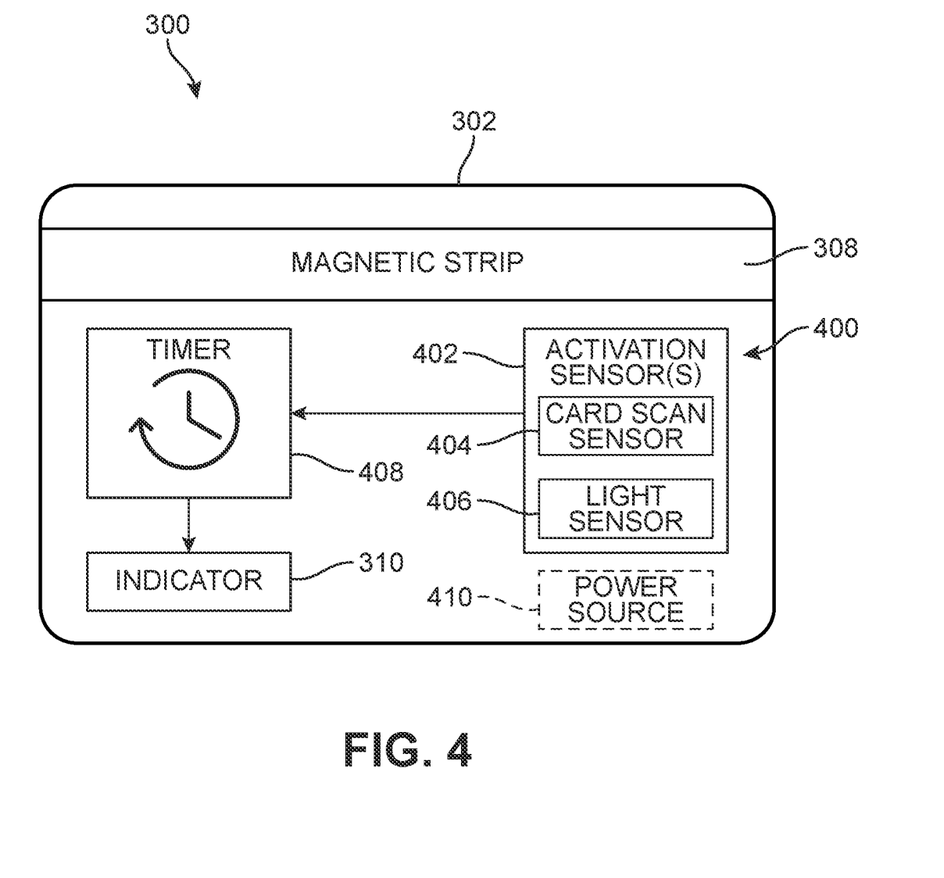
FIG. 4 is a schematic diagram showing an exemplary circuit for a card skimmer detection mechanism for a magnetic stripe card such as the card shown in FIG. 3.

FIG. 4 is a schematic diagram showing an exemplary circuit for a card skimmer detection mechanism for a magnetic stripe card such as card 300 shown in FIG. 3. In some embodiments, magnetic stripe card 300 may be provided with a skimmer detection mechanism 400 to detect when card 300 has been read by an illicit card skimming device and notify the user. In this embodiment, skimmer detection mechanism 400 is configured to detect when card 300 is skimmed by an illicit card skimming device by detecting when card 300 remains in a magnetic stripe card reader longer than normal. That is, because typical illicit card skimming devices are placed onto or over an existing magnetic stripe card reader (e.g., as shown in FIGS. 1 and 2), when a user inserts and then removes the card from the comprised card reader, the card will spend a longer amount of time within the slot of the card reader which has been modified or extended by the additional presence of the illicit card skimming device. By measuring the amount of time the card spends within the slot of the card reader and comparing the measured amount of time to a baseline associated with a normal, uncompromised magnetic stripe card reader, the presence of the illicit card skimming device may be detected.

In an example embodiment, skimmer detection mechanism 400 may be included in body 302 of magnetic stripe card 300. For example, components of skimmer detection mechanism 400 may be embedded or fixed within the material forming body 302, such as a plastic, polymer, or resin material. In one embodiment, skimmer detection mechanism 400 may include one or more activation sensors 402. Activation sensors 402 are configured to detect when card 300 is inserted and/or removed from a slot of a magnetic stripe card reader. In this embodiment, activation sensors 402 include a card scan sensor 404 and a light sensor 406.

Card scan sensor 404 detects when magnetic strip portion 308 of card 300 is swiped or pulled through the slot of a magnetic stripe card reader, such as shown in FIGS. 1 and 2, by detecting a change in the voltage generated in the coils of the magnetic stripe card reader caused by movement of card 300 through the slot. In an example embodiment, card scan sensor 404 may be a sensor configured to detect this change in voltage, such as a voltage sensor, or may be a sensor configured to detect related parameters, such as a current sensor or a magnetic field sensor, through known mathematical relationships.

Light sensor 406 is a photoelectric device that converts light energy into electrical energy. When light sensor 406 is exposed to visible light, an electrical signal is generated. The electric signal generated by exposure to light may be used to detect that card 300 has been transitioned from a relatively dark space (such as within the slot of the card reader) to a relatively light space (such as outside of the slot of the card reader).

In an example embodiment, activation sensors 402, including card scan sensor 404 and light sensor 406, may be used to start and stop a timer circuit 408. Timer circuit 408 is configured to measure an amount of time card 300 spends within the slot of the card reader in order to determine whether or not card 300 may have been skimmed by an illicit card skimming devices attached to a compromised magnetic stripe card reader.

In this embodiment, when card scan sensor 404 detects a change in the voltage generated in the coils of the magnetic stripe card reader caused by movement of card 300 through the slot of the card reader, timer circuit 408 is activated to start measuring an amount of time card 300 spends within the card reader. When card 300 is removed from the slot of the card reader, light sensor 406 generates an electric signal caused by exposure to light and deactivates timer circuit 408 to stop measuring the amount of time. With this arrangement, timer circuit 408 of skimmer detection mechanism 400 may measure the amount of time card 300 spends within the magnetic stripe card reader.

In some embodiments, timer circuit 408, or another circuit or processor within skimmer detection mechanism 400, may have a stored baseline time for how long a card associated with a normal, uncompromised magnetic stripe card reader is expected to be within the card reader. In some cases, the baseline time may be a predetermined maximum amount (i.e., no longer than a first amount of time). In other cases, the baseline time may be a range of acceptable amounts (i.e., between a second amount of time and a third amount of time). When an amount of time card 300 spends within the magnetic stripe card reader, as determined by timer circuit 408, exceeds or deviates from this baseline time, skimmer detection mechanism 400 may detect that card 300 has been skimmed (i.e., the confidential data stored in the magnetic strip portion 308 of card 300 has been scanned or accessed without authorization) by an illicit card skimming device.

In some embodiments, once skimmer detection mechanism 400 has detected that card 300 has been skimmed by the illicit card skimming device, indicator 310 embedded or included in body 302 of card 300 may be used to notify the user of card 300 of the skimming by the illicit card skimming device. In one embodiment, indicator 310 may be in the form of a light, such as a light emitting diode (LED), that illuminates when skimmer detection mechanism 400 has detected that card 300 has been skimmed by the illicit card skimming device. Other embodiments of indicators are described below with reference to FIGS. 9A-9D. With this arrangement, the user of card 300 may see that indicator 310 is illuminated (e.g., as shown in FIG. 3) to be notified of that skimming of card 300 by an illicit card skimming device has occurred.

In some embodiments, card 300 may include a power source 410. Power source 410 may provide electrical energy to one or more components of skimmer detection mechanism 400 of card 300, including but not limited to: activation sensors 402, timer circuit 408, and/or indicator 310. In some cases, power source 410 may be a battery. For example, power source 410 may be a thin-film battery such as a non-rechargeable or a rechargeable lithium polymer battery. Such battery could be, for example, 0.5 mm to 1.0 mm thick and 30-40 mm×30-40 mm square, or could be rectangular with an area of 800 mm square to 2,000 mm square, for example, or could be any other shape or size that provides power effective to accomplish the functions of skimmer detection mechanism 400. In other cases, power source 410 may be provided by an energy harvesting circuit that is configured to transform voltage, current, or magnetic fields generated by the scan of card 300 into electrical energy used to power the components of skimmer detection mechanism 400.

Figure 5:
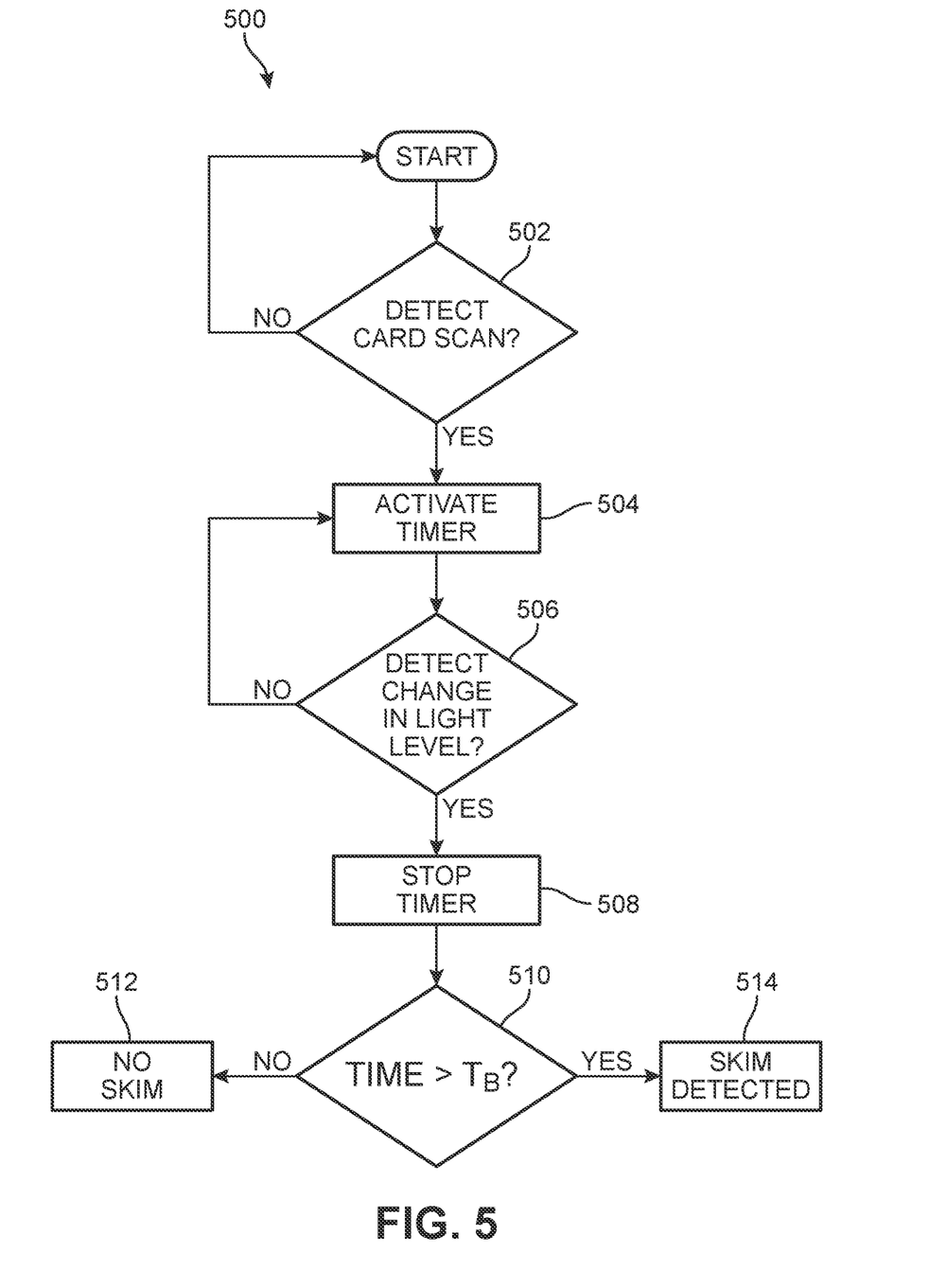
FIG. 5 is a flowchart of an example embodiment of a method of detecting card skimming by a skimmer detection mechanism for a magnetic stripe card such as the card shown in FIGS. 3 and 4.

FIG. 5 is a flowchart of an example embodiment of a method 500 of detecting card skimming by a skimmer detection mechanism for a magnetic stripe card, such as skimmer detection mechanism 400 of card 300 shown in FIGS. 3 and 4. In an example embodiment, method 500 may begin at an operation 502 where a scan of the magnetic stripe card is detected. For example, operation 502 may include detecting a scan of card 300 through a slot of a card reader by card scan sensor 404, as described above.

Next, method 500 includes an operation 504. At operation 504, upon detection of the card scan, a timer is activated. For example, operation 504 may include timer circuit 408 being activated by receiving a signal from card scan sensor 404 that causes timer circuit 408 to begin measuring an amount of time. The timer remains counting the amount of time the card is within the card reader until a change in a light level is detected at an operation 506. For example, as described above, light sensor 406 may generate an electrical signal upon exposure to light once card 300 has been removed from the card reader. Upon determining at operation 506 that the change in light level has been detected (i.e., the result of operation 506 is "Yes"), then method 500 proceeds to an operation 508 where the timer is stopped. For example, the electrical signal generated by light sensor 406 upon exposure to light once card 300 has been removed from the card reader may deactivate timer circuit 408 to stop measuring the amount of time card 300 has been within the card reader. Operation 508 may also include calculating the amount of time measured by the timer (i.e., the amount of time between when the timer was activated at operation 504 and stopped at operation 508).

Method 500 may then proceed to an operation 510. At operation 510, the amount of time measured by the timer (e.g., the amount of time card 300 has been within the card reader) from operation 508 is compared with a baseline time. As described above, the baseline time is how long a card associated with a normal, uncompromised magnetic stripe card reader is expected to be within the card reader.

Upon determining at operation 510 that the amount of time measured by the timer is not greater than the baseline time (e.g., the result of operation 510 is "No"), then method 500 proceeds to an operation 512 where it is determined that the card has not been skimmed. Upon determining at operation 510 that the amount of time measured by the timer is greater than the baseline time (e.g., the result of operation 510 is "Yes"), then method 500 proceeds to an operation 514 where it is determined that the card has been skimmed by an illicit card skimming device.

In some embodiments, method 500 may further include additional operations where the user of the card is notified of the result from the skimmer detection mechanism. In some cases, the user may be notified when a skim has been detected (i.e., in response to operation 514), for example, via indicator 310. In other cases, the user may be notified when a skim has not been detected (i.e., in response to operation 512), for example, via indicator 310. In still other cases, the user may be notified of either or both results (i.e., either or both of operation 512 and 514), for example, via indicator 310. In these cases, indicator 310 may use different illumination modes or colors to indicate no skim (i.e., in response to operation 512) or a skim (i.e., in response to operation 514). Various embodiments for notifying a user of a skim, no skim, both or either are described in more detail below with reference to the indicators shown in FIGS. 9A-9D.

Figure 6:
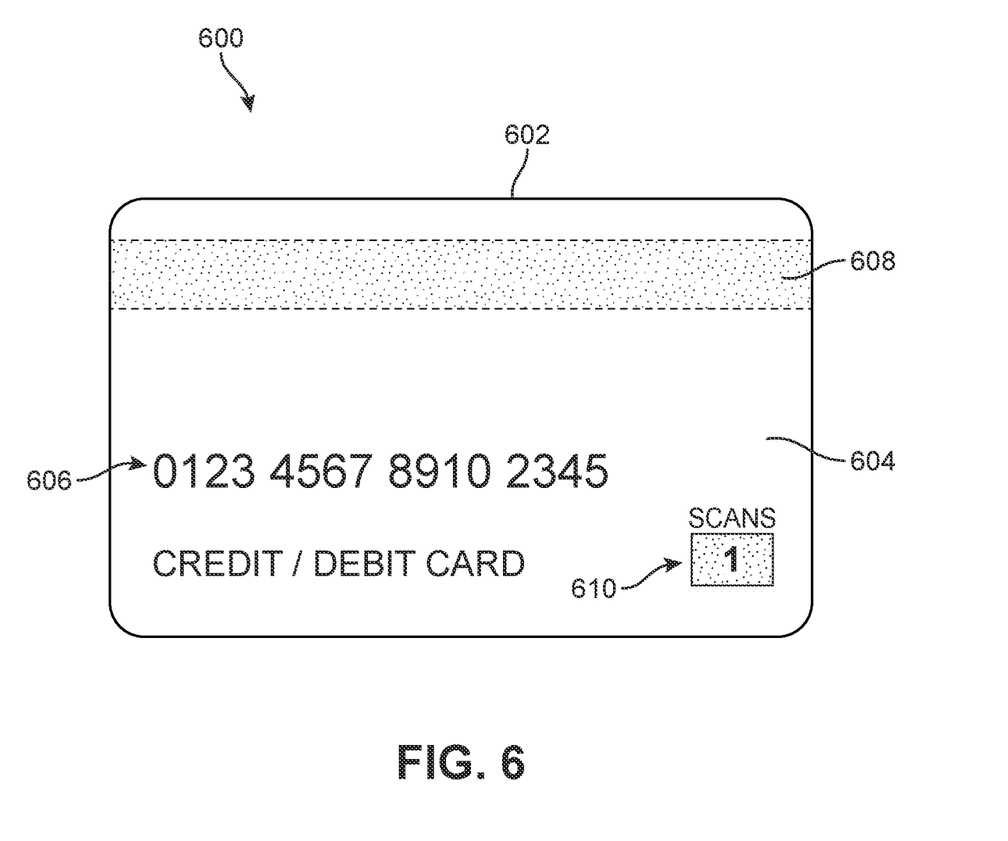
FIG. 6 is another embodiment of magnetic stripe card with a skimmer detection mechanism.

Referring now to FIG. 6, another embodiment of a magnetic stripe card with a skimmer detection mechanism is shown. In some embodiments, a magnetic stripe card 600 may be provided with a skimmer detection mechanism to detect when card 600 has been read by an illicit card skimming device and notify the user. In this embodiment, card 600 has a body 602 having a generally rectangular shape. The length and width of body 602 of card 600 generally matches the length and width of a conventional credit card. In some embodiments, card 600 may have a generally uniform thickness, while in other embodiments, card 600 may have different thicknesses. In an example embodiment, card 600 has a front side 604 on which card information 606 may be provided. Card information 606 may include, but is not limited to: a credit card number, expiration date, card holder name, issuing bank name, security codes, etc. In some cases, portions of card information 606 may be additionally or alternatively located on the back side of card 600 (e.g., opposite from front side 604).

In an example embodiment, card 600 includes a magnetic strip region 608. In this embodiment, magnetic strip region 608 is located on the back side of card 600 (e.g., opposite from front side 604). In other embodiments, magnetic strip region 608 may be located on front side 604 of card 600. Magnetic strip region 608 is encoded with confidential data. Magnetic strip region 608 may be any suitable type of magnetic strip, as described above in reference to magnetic strip region 308 of card 300.

In the example embodiments, the shape and thickness of body 602 of card 600 are sized and dimensioned so that card 600 is able to slide into a conventional magnetic stripe card reader, such as magnetic stripe card reader 100, described above. Likewise, magnetic strip region 608 has a thickness that is selected so that magnetic strip region 608 can slide into a conventional magnetic card stripe reader, such as magnetic stripe card reader 100, described above. In some embodiments, the thicknesses of magnetic strip region 608 of card 600 may match the thickness of a conventional credit card.

In an example embodiment, card 600 includes an indicator 610 associated with a skimmer detection mechanism. Indicator 610 is configured to notify a user of card 600 how many times card 600 has been scanned by one or more card reader devices, including an illicit card skimming device, as will be described in more detail below. In an example embodiment, indicator 610 may include a display screen, such as an e-ink or LED display, that shows a user of card 600 how many times card 600 has been scanned. In this embodiment, indicator 610 is located on front side 604 of card 600, for example, adjacent to or near card information 606, so that indicator 610 may be easily visible and/or noticeable by a user of card 600. In other embodiments, indicator 610 may be located on other portions of card 600, including, for example, on the back side.

Figure 7:
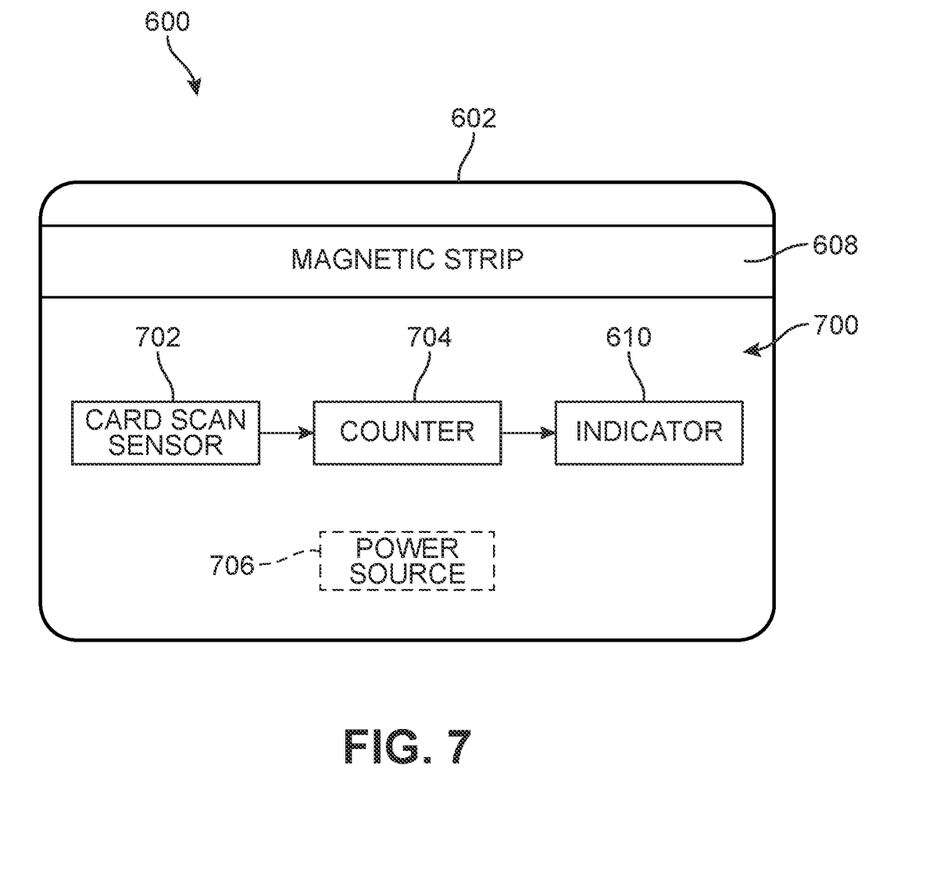
FIG. 7 is a schematic diagram showing another exemplary circuit for a card skimmer detection mechanism for a magnetic stripe card such as the card shown in FIG. 6.

FIG. 7 is a schematic diagram showing an exemplary circuit for another embodiment of a card skimmer detection mechanism for a magnetic stripe card such as card 600 shown in FIG. 6. In some embodiments, magnetic stripe card 600 may be provided with a skimmer detection mechanism 700 to detect a number of times that card 600 has been read by one or more magnetic stripe card readers, including an illicit card skimming device, and notify the user. In this embodiment, skimmer detection mechanism 700 is configured to detect and count each time magnetic strip portion 608 of card 600 is scanned so that any additional scans from the skimming by an illicit card skimming device may be detected. That is, because typical illicit card skimming devices are placed onto or over an existing magnetic stripe card reader (e.g., as shown in FIGS. 1 and 2), when a user inserts and then removes the card from the comprised card reader, the confidential data on the magnetic strip of the card will be scanned by both the authorized card reader and the illicit card skimming device (e.g., first scan 204 and second scan 206, described above). By counting the number of times the magnetic strip of the card is scanned, the presence of the illicit card skimming device may be detected.

In an example embodiment, skimmer detection mechanism 700 may be included in body 602 of magnetic stripe card 600. For example, components of skimmer detection mechanism 700 may be embedded or fixed within the material forming body 602, such as a plastic, polymer, or resin material. In one embodiment, skimmer detection mechanism 700 may include a card scan sensor 702 that is configured to detect when card 600 is scanned by a magnetic stripe card reader.

Card scan sensor 702 detects when magnetic strip portion 608 of card 600 is swiped or pulled through the slot of a magnetic stripe card reader, such as shown in FIGS. 1 and 2, by detecting a change in the voltage generated in the coils of the magnetic stripe card reader caused by movement of card 600 through the slot. In an example embodiment, card scan sensor 702 may be a sensor configured to detect this change in voltage, such as a voltage sensor, or may be a sensor configured to detect related parameters, such as a current sensor or a magnetic field sensor, through known mathematical relationships.

In an example embodiment, skimmer detection mechanism 700 may also include a counter circuit 704. Counter circuit 704 is configured to be incremented upon receiving a signal from card scan sensor 702 that card 600 has been scanned by a magnetic stripe card reader. Counter circuit 704 keeps track of a number of times card 600 has been scanned. In an example embodiment, counter circuit 704 is configured to clear or reset the count upon expiration of a predetermined period of time. For example, counter circuit 704 may clear the number of times card 600 has been scanned upon expiration of the predetermined period of time, which may be several seconds (e.g., 2-5 seconds), several minutes (e.g., 2-5 minutes), or some other predetermined period of time during which the detection of multiple scans of card 600 would be indicative of the presence of an illicit card skimming device.

In this embodiment, each time card scan sensor 702 detects a change in the voltage generated in the coils of the magnetic stripe card reader caused by movement of card 600 through the slot of the card reader, counter circuit 704 is incremented by one. In some embodiments, counter circuit 704, or another circuit or processor within skimmer detection mechanism 700, may have a stored baseline count for how many times a card associated with a normal, uncompromised magnetic stripe card reader is expected to be scanned (e.g., one scan) within the predetermined time period. When the number of scans detected by card scan sensor 702 and counted by counter circuit 704 within the predetermined time period, exceeds or deviates from the baseline value (e.g., one), skimmer detection mechanism 700 may detect that card 600 has been skimmed (i.e., the confidential data stored in the magnetic strip portion 608 of card 600 has been scanned or accessed without authorization) by an illicit card skimming device.

In some embodiments, once skimmer detection mechanism 700 has detected that card 600 has been skimmed by the illicit card skimming device, indicator 610 embedded or included in body 602 of card 600 may be used to notify the user of card 600 of the skimming by the illicit card skimming device. In one embodiment, indicator 610 may be in the form of a display, such as an e-ink or LED display, that shows a user of card 600 how many times card 600 has been scanned. Other embodiments of indicators are described below with reference to FIGS. 9A-9D. With this arrangement, the user of card 600 may see the number of scans shown on indicator 610 (e.g., as shown in FIG. 6) to be notified of that skimming of card 600 by an illicit card skimming device has occurred.

In some embodiments, card 600 may include a power source 706. Power source 706 may provide electrical energy to one or more components of skimmer detection mechanism 700 of card 600, including but not limited to: card scan sensor 702, counter circuit 704, and/or indicator 610. In some cases, power source 706 may be a battery. For example, power source 706 may be a thin-film battery such as a non-rechargeable or a rechargeable lithium polymer battery. Such battery could be, for example, 0.5 mm to 1.0 mm thick and 30-40 mm×30-40 mm square, or could be rectangular with an area of 800 mm square to 2,000 mm square, for example, or could be any other shape or size that provides power effective to accomplish the functions of skimmer detection mechanism 700. In other cases, power source 706 may be provided by an energy harvesting circuit that is configured to transform voltage, current, or magnetic fields generated by the scan of card 600 into electrical energy used to power the components of skimmer detection mechanism 700.

Figure 8:
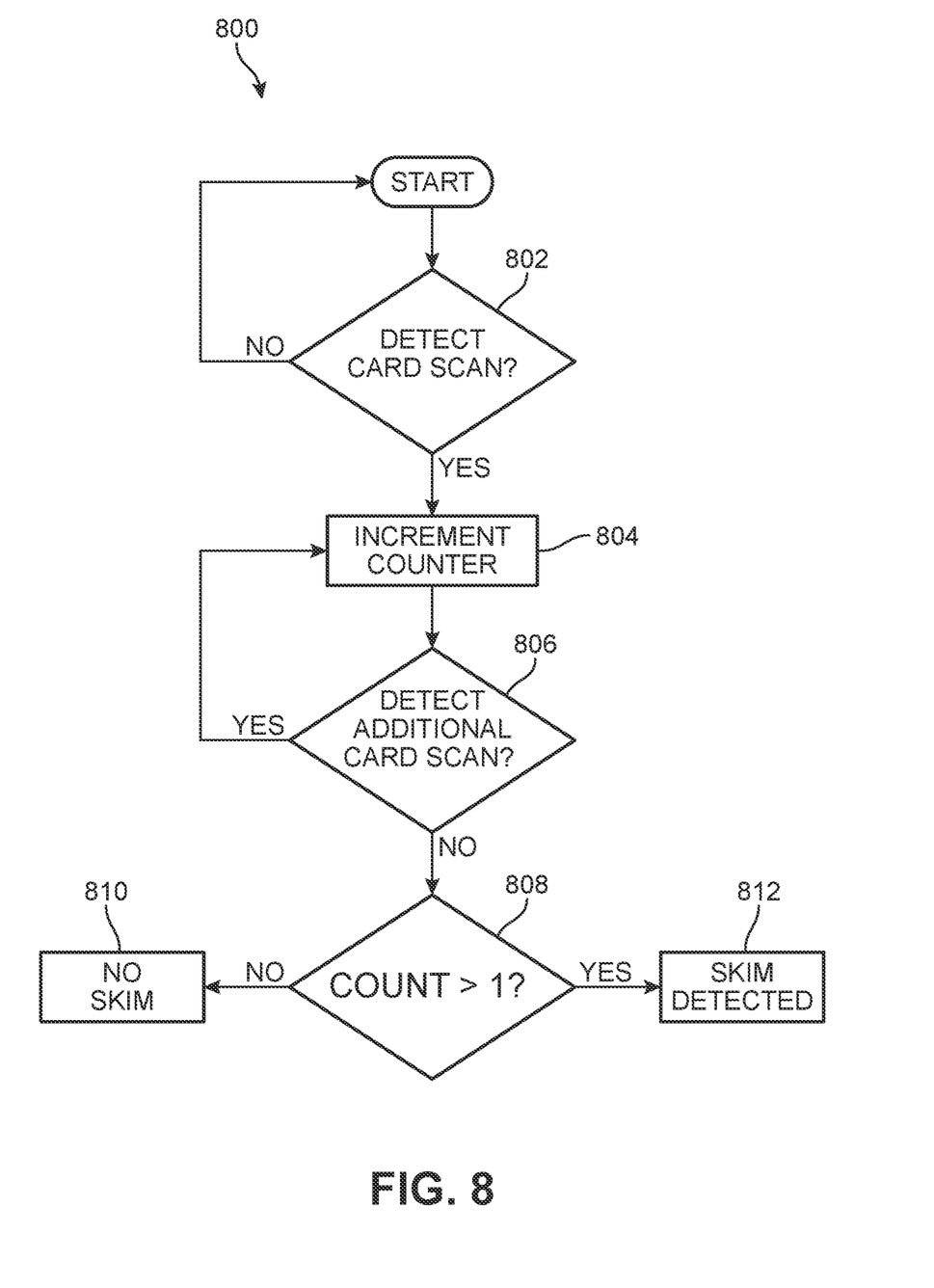
FIG. 8 is a flowchart of an example embodiment of a method of detecting card skimming by a skimmer detection mechanism for a magnetic stripe card such as the card shown in FIGS. 6 and 7.

FIG. 8 is a flowchart of an example embodiment of a method 800 of detecting card skimming by a skimmer detection mechanism for a magnetic stripe card, such as skimmer detection mechanism 700 of card 600 shown in FIGS. 6 and 7. In an example embodiment, method 800 may begin at an operation 802 where a scan of the magnetic stripe card is detected. For example, operation 802 may include detecting a scan of card 600 through a slot of a card reader by card scan sensor 702, as described above.

Next, method 800 includes an operation 804. At operation 804, upon detection of the card scan, a counter is incremented. For example, operation 804 may include counter circuit 704 being incremented by receiving a signal from card scan sensor 702 that causes counter circuit 704 to increment a counter by one. As described above, counter circuit 704 may be configured to clear or reset the counter upon expiration of a predetermined period of time.

Method 800 includes an operation 806 where additional card scans are detected. Upon determining at operation 806 that another card scan has been detected (i.e., the result of operation 806 is "Yes"), then method 800 proceeds back to operation 804 where the counter is incremented again for each additional scan detected at operation 806. Upon determining at operation 806 that no further card scans are detected (i.e., the result of operation 806 is "No") within the predetermined time period for the counter, described above, then method 800 proceeds to an operation 808.

At operation 808, the number of card scans measured by the counter (e.g., the number of times card 600 has been scanned by a card reader) from operation 804 is compared with a baseline or threshold value. As described above, the baseline or threshold value is a number of times a card associated with a normal, uncompromised magnetic stripe card reader is expected to be scanned by the card reader within a predetermined period of time (e.g., one scan).

Upon determining at operation 808 that the scan count measured by the counter is not greater than the baseline or threshold value of one in this example (e.g., the result of operation 808 is "No"), then method 800 proceeds to an operation 810 where it is determined that the card has not been skimmed. Upon determining at operation 808 that the scan count measured by the counter is greater than the baseline or threshold value of one in this example (e.g., the result of operation 808 is "Yes"), then method 800 proceeds to an operation 812 where it is determined that the card has been skimmed by an illicit card skimming device.

In some embodiments, method 800 may further include additional operations where the user of the card is notified of the result from the skimmer detection mechanism. In an example embodiment, the user may see the scan count determined by the counter (e.g., counter circuit 704) on a display screen on front side 604 of card 600. For example, as shown in FIG. 6, card 600 shows a scan count of "1" on a display screen of indicator 610. With this arrangement, the user can check indicator 610 after swiping or using card 600 and see the number of scans detected by skimmer detection mechanism 700.

In other embodiments, the user may be notified when a skim has been detected (i.e., in response to operation 812) and/or when a skim has not been detected (i.e., in response to operation 810), for example, via indicator 610. In still other cases, the user may be notified of either or both results (i.e., either or both of operation 810 and 812), for example, via indicator 610. In these cases, indicator 610 may use different numbers or symbols to indicate no skim (i.e., in response to operation 810) or a skim (i.e., in response to operation 812). Various embodiments for notifying a user of a skim, no skim, both or either are described in more detail below with reference to the indicators shown in FIGS. 9A-9D.

Referring now to FIGS. 9A-9D, different embodiments of indicators are shown for notifying a user of a magnetic stripe card of the analysis by a skimmer detection mechanism, including skimmer detection mechanism 400 and/or skimmer detection mechanism 700. It should be understood that a card may include any one or more of the indicators shown in FIGS. 9A-9D and that other indicators not explicitly shown may also be used.

Figure 9A:
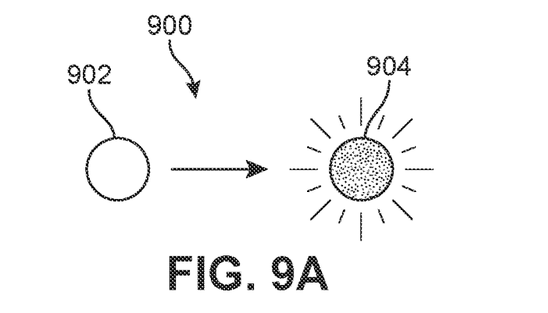
FIG. 9A is a schematic view of an example embodiment of an indicator for alerting a user of a magnetic stripe card of card skimming by an illicit card skimming device.

FIG. 9A illustrates a first embodiment of an indicator 900. In this embodiment, indicator 900 may be in the form of a single LED that is located on a magnetic stripe card including a skimmer detection mechanism. In this embodiment, indicator 900 includes a first mode 902 where the LED is unlit or non-illuminated and a second mode 904 where the LED is lit or illuminated. In an example embodiment, indicator 900 may receive a signal from a skimmer detection mechanism to illuminate the LED in response to detecting that a skim of the card has occurred. That is, the skimmer detection mechanism may trigger the LED of indicator 900 to transition from the initial, first mode 902 where the LED is non-illuminated to the second mode 904 where the LED is illuminated in response to detection of a skim by an illicit card skimming device. With this arrangement, the user may notice that the LED of indicator 900 is illuminated to be notified that the confidential data stored in the magnetic strip of the user's card has been scanned or accessed without authorization by an illicit card skimming device.

In other embodiments, indicator 900 may receive a signal from a skimmer detection mechanism to illuminate the LED in response to detecting that no skim of the card has occurred. That is, the skimmer detection mechanism may trigger the LED of indicator 900 to transition from the initial, first mode 902 where the LED is non-illuminated in the second mode 904 where the LED is illuminated in response to not detecting a skim by an illicit card skimming device. With this arrangement, the user may notice that the LED of indicator 900 is illuminated to receive confirmation by indicator 900 that no skimming has occurred. In some cases, the LED of indicator 900 may illuminate in different colors depending on whether it notifies the user of a skim (e.g., red) or no skim (e.g., green).

Figure 9B:
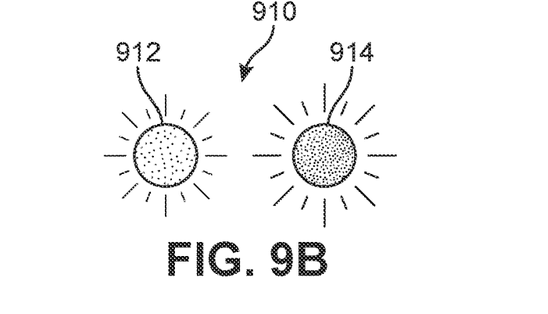
FIG. 9B is a schematic view of another embodiment of an indicator for alerting a user of a magnetic stripe card of card skimming by an illicit card skimming device.

FIG. 9B illustrates a second embodiment of an indicator 910. In this embodiment, indicator 910 may be in the form of a pair LEDs that are located on a magnetic stripe card including a skimmer detection mechanism. In this embodiment, indicator 910 includes a first LED 912 and a second LED 914. In an example embodiment, indicator 910 may receive a signal from a skimmer detection mechanism to illuminate one of first LED 912 or second LED 914 in response to determining whether or not a skim of the card has occurred. That is, the skimmer detection mechanism may trigger first LED 912 of indicator 910 to illuminate in response to detecting that no skim of the card has occurred and may trigger second LED 914 in response to detecting that a skim of the card has occurred. With this arrangement, the user may notice which LED of indicator 910 is illuminated to be notified that the confidential data stored in the magnetic strip of the user's card has been scanned or accessed without authorization by an illicit card skimming device or if no skimming has occurred. In some cases, each LED of indicator 910 may illuminate in different colors depending on whether it notifies the user of a skim (e.g., red for second LED 914) or no skim (e.g., green for first LED 912).

Figure 9C:
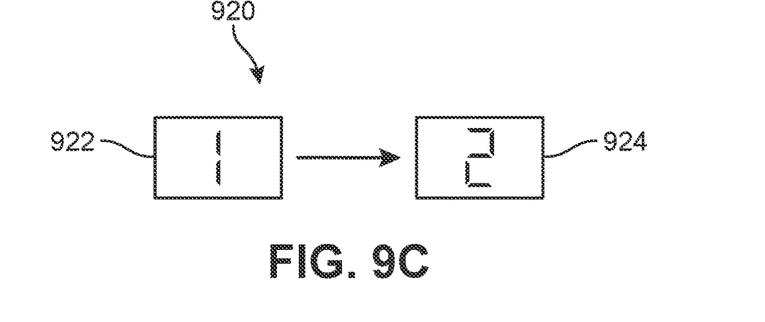
FIG. 9C is a schematic view of another embodiment of an indicator for alerting a user of a magnetic stripe card of card skimming by an illicit card skimming device.

FIG. 9C illustrates a third embodiment of an indicator 920. In this embodiment, indicator 920 may be in the form of a display screen, such as an e-ink or LED screen, that is embedded or included on a magnetic stripe card including a skimmer detection mechanism. In an example embodiment, indicator 920 may display an alphanumeric character in response to the skimmer detection mechanism determining whether or not a skim of the card has occurred. For example, in this embodiment, indicator 920 may display a first number 922 (e.g., "1") in response to the skimmer detection mechanism detecting that no skim of the card has occurred to signify that only one scan of the card was detected. Indicator 920 may display a second number 924 (e.g., "2") in response to skimmer detection mechanism detecting that a skim of the card has occurred to signify that two scans of the card were detected (i.e., indicating an unauthorized access of the confidential data on the magnetic strip of the card by an illicit card skimming device). In other embodiments, different alphanumeric characters or symbols may be displayed on the display screen of indicator 920 to indicate whether or not a skim was detected by the skimmer detection mechanism.

Figure 9D:
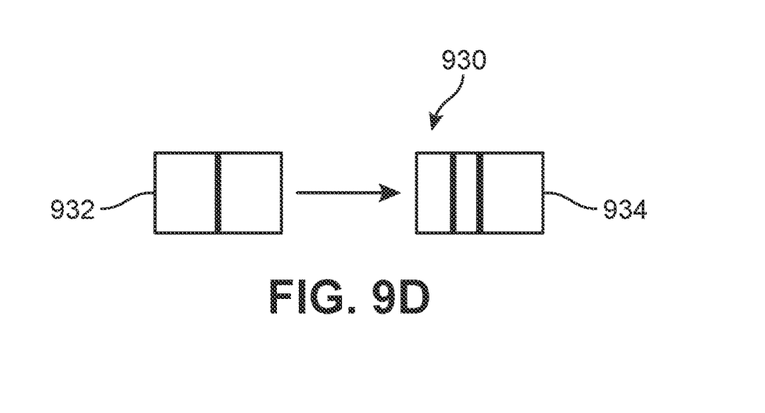
FIG. 9D is a schematic view of another embodiment of an indicator for alerting a user of a magnetic stripe card of card skimming by an illicit card skimming device.

FIG. 9D illustrates a fourth embodiment of an indicator 930. In this embodiment, indicator 930 may be in the form of a display screen, such as an e-ink or LED screen, that is embedded or included on a magnetic stripe card including a skimmer detection mechanism. In an example embodiment, indicator 930 may display a vertical line in response to the skimmer detection mechanism determining whether or not a skim of the card has occurred. For example, in this embodiment, indicator 930 may display a first vertical line 932 in response to the skimmer detection mechanism detecting that no skim of the card has occurred and/or to signify that only one scan of the card was detected. Indicator 930 may display a pair of vertical lines 934 in response to skimmer detection mechanism detecting that a skim of the card has occurred and/or to signify that two scans of the card were detected (i.e., indicating an unauthorized access of the confidential data on the magnetic strip of the card by an illicit card skimming device). In other embodiments, different characters or symbols may be displayed on the display screen of indicator 930 to indicate whether or not a skim was detected by the skimmer detection mechanism.

The components of the card skimming detection mechanisms described herein, including the sensors, circuitry, power source or battery, and circuits connecting the power source or battery to the components may be applied by using printing, by using electrochemistry, by using silk screening or by any other technology for depositing a thin electrically conductive layer or conductor on a magnetic stripe card.

Also, the location of the sensors, circuitry, power source or battery, and other components shown in the schematic diagrams are merely exemplary, and numerous different configurations and layouts of these components within a magnetic stripe card may be used. Furthermore, the circuits and/or sensors shown above in FIG. 4 and FIG. 8 are also exemplary and the functions and operations performed by those circuits and/or sensors may be performed by many other electronic circuits and/or sensors.

While various embodiments have been described above, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A magnetic stripe card comprising:

a body;

a magnetic strip portion disposed on the body;

a timer circuit; and skimmer detection circuitry configured to detect when the magnetic strip portion of the magnetic stripe card has been read by an illicit card skimming device;

wherein the skimmer detection circuitry comprises:

a card scan sensor that detects a change in voltage generated in coils of a magnetic stripe card reader caused by movement of the magnetic stripe card through a slot of the magnetic stripe card reader; and a light sensor that generates an electrical signal upon exposure to light;

wherein the timer circuit is activated upon detection of a change in voltage generated in the coils of the magnetic stripe card reader by the card scan sensor to start measuring an amount of time the magnetic stripe card spends within the magnetic stripe card reader;

wherein the timer circuit is deactivated upon receiving the electrical signal from the light sensor caused by exposure to light to stop measuring the amount of time the magnetic stripe card spends within the magnetic stripe card reader; and wherein when measured amount of time from the timer circuit exceeds or deviates from a baseline time, the skimmer detection circuitry determines that the magnetic strip portion of the magnetic stripe card has been read by the illicit card skimming device.

2. The magnetic stripe card according to claim 1, wherein the card scan sensor comprises a voltage sensor.

3. The magnetic stripe card according to claim 1, wherein the card scan sensor comprises a current sensor.

4. The magnetic stripe card according to claim 1, wherein the baseline time is a predetermined maximum amount of time.

5. The magnetic stripe card according to claim 1, wherein the baseline time is a range between two amounts of time.

6. The magnetic stripe card according to claim 1, further comprising an indicator; and
wherein the indicator is configured to notify a user of the magnetic stripe card in response to when the skimmer detection circuitry detects that the magnetic strip portion has been read by the illicit card skimming device.

7. The magnetic stripe card according to claim 1, further comprising a battery.

8. The magnetic stripe card according to claim 1, further comprising a counter circuit.

9. The magnetic stripe card according to claim 8, wherein a number of times the magnetic strip portion of the magnetic stripe card has been scanned is compared to a predetermined threshold value to detect that the magnetic strip portion has been read by the illicit card skimming device.

10. The magnetic stripe card according to claim 1, further comprising a force sensor;
wherein an amount of force applied to the magnetic stripe card by the magnetic stripe card reader is measured by the force sensor; and
wherein the amount of force is compared to a predetermined threshold value to detect that the magnetic strip portion has been read by the illicit card skimming device.

11. A magnetic stripe card comprising:
a magnetic strip portion;
skimmer detection circuitry comprising:
a card scan sensor that detects a change in voltage generated in coils of a magnetic stripe card reader caused by movement of the magnetic stripe card through a slot of the magnetic stripe card reader; and
a light sensor that generates an electrical signal upon exposure to light;
a timer circuit; and
an indicator;
wherein the timer circuit is activated upon detection of a change in voltage generated in the coils of the magnetic stripe card reader by the card scan sensor to start measuring an amount of time and wherein the timer circuit is deactivated upon receiving the electrical signal from the light sensor caused by exposure to light to stop measuring the amount of time;
wherein when the measured amount of time from the timer circuit exceeds or deviates from a baseline time, the skimmer detection circuitry determines that the magnetic strip portion of the magnetic stripe card has been read by an illicit card skimming device; and
wherein the indicator is configured to notify a user of the magnetic stripe card in response to when the skimmer detection circuitry detects that the magnetic strip portion has been read by the illicit card skimming device.

12. The magnetic stripe card according to claim 11, wherein the indicator comprises a light emitting diode (LED).

13. The magnetic stripe card according to claim 12, wherein the LED is configured to illuminate when the skimmer detection circuitry detects that the magnetic strip portion has been read by an illicit card skimming device.

14. The magnetic stripe card according to claim 12, wherein the LED is configured to illuminate with a first color when the skimmer detection circuitry detects that the magnetic strip portion has been read by an illicit card skimming device; and
wherein the LED is configured to illuminate with a second color that is different from the first color when the skimmer detection circuitry detects that the magnetic strip portion has been not read by an illicit card skimming device.

15. The magnetic stripe card according to claim 11, wherein the indicator comprises a first light emitting diode (LED) and a second LED.

16. The magnetic stripe card according to claim 15, wherein the first LED is configured to illuminate when the skimmer detection circuitry detects that the magnetic strip portion has been read by an illicit card skimming device; and
wherein the second LED is configured to illuminate when the skimmer detection circuitry detects that the magnetic strip portion has been not read by an illicit card skimming device.

17. The magnetic stripe card according to claim 11, wherein the indicator comprises a display screen.

18. A method of detecting an unauthorized scan of confidential data encoded on a magnetic strip portion of a magnetic stripe card having skimmer detection circuitry, the method comprising:
detecting a scan of the magnetic strip portion of the magnetic stripe card by a card scan sensor of the magnetic stripe card that detects a change in voltage generated in coils of a magnetic stripe card reader caused by movement of the magnetic stripe card through a slot of the magnetic stripe card reader;
activating a timer circuit of the magnetic stripe card upon detection of a change in voltage generated in the coils of the magnetic stripe card reader by the card scan sensor to start measuring an amount of time the magnetic stripe card spends within the magnetic stripe card reader;
deactivating the timer circuit upon receiving an electrical signal from a light sensor of the magnetic stripe card, the electrical signal caused by exposure to light detected by the light sensor to stop measuring the amount of time the magnetic stripe card spends within the magnetic stripe card reader;
comparing the measured amount of time from the timer circuit to a baseline time; and
upon determining that the measured amount of time exceeds or deviates from the baseline time, detecting an unauthorized scan of confidential data encoded on the magnetic strip portion of the magnetic stripe card.

19. The method according to claim 18, wherein the baseline time is one of a predetermined maximum amount of time or a range between two amounts of time.

20. The method according to claim 18, further comprising:
upon detecting the unauthorized scan, notifying a user of the magnetic stripe card using an indicator located on the magnetic stripe card.

* * * * *